No. 863,567. PATENTED AUG. 13, 1907.
W. BRIERLEY.
STEERING MECHANISM.
APPLICATION FILED JUNE 22, 1907.
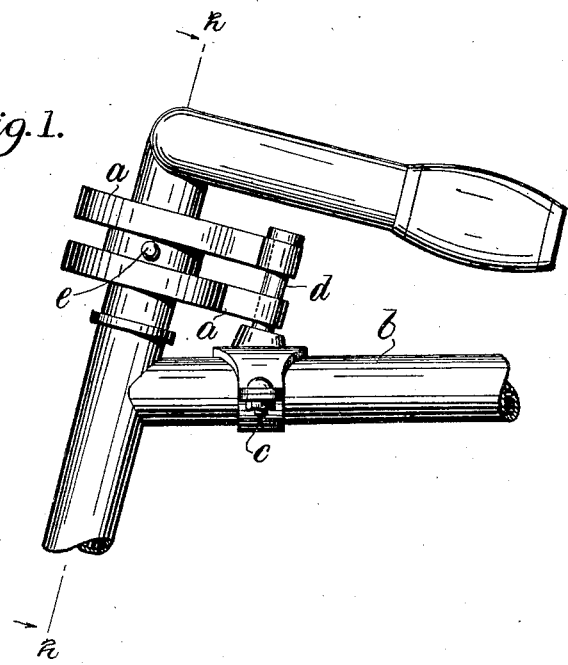
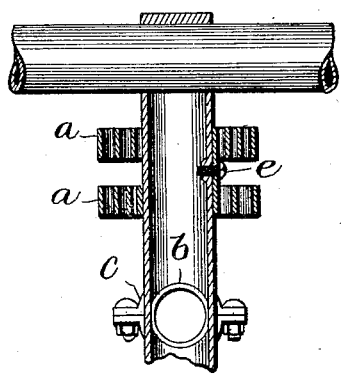
Witnesses.
Inventor.
W. Brierley,
by Wilkinson Fisher &
Wilkinson
Attorneys.

UNITED STATES PATENT OFFICE.

WYNFORD BRIERLEY, OF NEW MALDEN, ENGLAND.

STEERING MECHANISM.

No. 863,567.

Specification of Letters Patent.

Patented Aug. 13, 1907.

Application filed June 22, 1907. Serial No. 380,368.

*To all whom it may concern:*

Be it known that I, WYNFORD BRIERLEY, a subject of the King of England, residing at Parkstone, Coombe Road, New Malden, in the county of Surrey, England, have invented certain new and useful Improvements Relating to Steering Mechanism; and I do hereby declare the following to be a full, clear, and exact description of the invention, such as will enable others skilled in the art to which it appertains to make and use the same.

My invention relates to improvements in steering mechanism. In the form shown in the drawings, I have shown it as applied to a bicycle, but obviously it may be applied to motor vehicles or boats, to enable the operators to steer or control them with greater ease and safety. Attempts have been made to effect the objects named above by means of two oppositely acting separate springs; but this has been found to be defective in practice, one reason being the difficulty of obtaining separate springs of exactly the same tension.

In the accompanying drawings, Figure 1 shows in side elevation a steering post and adjacent parts of a bicycle, having my invention embodied therein, and Fig. 2 is a cross-section on the line 2—2 of Fig. 1.

In this embodiment of the invention there is fixed to the steering post of a bicycle a compound spiral or convolute spring, one-half of which is coiled in one direction and the other half in the other direction, and having its ends lugged to the frame by a bolt parallel to the axis of rotation of the steering post, so that said spring tends to hold the post in a position of equilibrium in a sufficiently restrained manner to prevent undue oscillation, and at the same time to enable the bicycle to be steered with ease in any direction. This arrangement also admits of a bycycle being supported more firmly when not in use, because there is less freedom of motion of the steering post.

I make the spring from a single piece of metal, half of which is coiled in one direction and the other half in the opposite direction, with a hole in the part connecting the two coils to enable it to be securely fastened to the steering post. By this means I obtain a spring of the same tension throughout.

$a$ represents a compound convolute spring, with its halves coiled in opposite directions, with its ends clamped on to the top of tube $b$ of the diamond frame by means of a clasp $c$. Attached to or formed integral with the clasp $c$, is the pin $d$, to which the ends of the spring $a$ are attached, the middle of the spring being attached to the steering post of the machine by means of a pin $e$.

In case of motor cars and like vehicles, the compound spring may be fixed to the steering pillar or preferably to the worm-gear shaft, with the ends fastened to a fixed part of the machine. In case of a boat, the spring is attached to the tiller post, with its ends secured to a fixed portion of the boat.

Having thus described my invention, what I claim as new, and desire to secure by Letters Patent, is:

1. The combination of a steering post and a compound convolute spring fastened thereto at its center, and having its halves coiled in opposite directions from said center, and means for securing the free ends of the spring, substantially as described.

2. In a bicycle, the combination with the frame thereof, of a steering post, a compound convolute spring, having its center attached to said post, and having its halves coiled in opposite directions, and a pin carried by the frame of the machine, to which the ends of said spring are fastened, substantially as described.

Dated this 12th day of June, 1907.

In testimony whereof, I affix my signature, in presence of two witnesses.

WYNFORD BRIERLEY.

Witnesses:
A. E. VIDAL,
A. BROWNE.